United States Patent Office 3,674,428
Patented July 4, 1972

3,674,428
MERCURY REMOVAL
Warren E. Dean and Charles M. Dorsett, New Martinsville, W. Va., assignors to PPG Industries, Inc., Pittsburgh, Pa.
No Drawing. Filed Dec. 22, 1970, Ser. No. 100,833
Int. Cl. C01g 1/12, 13/00
U.S. Cl. 23—134                                    7 Claims

ABSTRACT OF THE DISCLOSURE

A process for removing mercury from an alkaline solution having a pH of at least 7 is provided comprising intermixing with said solution a sulfur compound in an amount sufficient to provide sulfide ion in an amount greater than the stoichiometric equivalent of mercury, oxidizing the soluble mercury polysulfide and recovering the insoluble mercury sulfide.

---

This invention relates to a process for removing mercury from alkaline solutions and particularly removing mercury from mercury electrolytic cell effluent and waste streams containing mercury.

Several methods are known for recovering mercury. For example, British Pat. 916,866 adds sulfide ions to a chlorine-containing brine until the redox potential relative to the saturated KCl-Calomel electrode is in the range +0.85 volt to +0.93 volt, raising the pH in the range 7–9 by the addition of alkali and then continuing the introduction of sulfide ions into the brine until the redox potential is in the range of 0 to −0.2 volt, flocculating the precipitate obtained, settling the precipitate and separating the substantially mercury-free brine.

U.S. Pat. 2,860,952 (Bergeron et al.) adds at least a stoichiometric amount of sulfide to react with the soluble mercury present in a slightly acidic brine and preferably a stoichiometric excess in the range of 20 to 100 percent, adding thereto a soluble ferric compound and starch or gum arabic, and adjusting the pH of the brine to between 8 and 10 by the addition of sodium hydroxide. Thus, these references describe adding sulfide ion to the acidic brine and then raising the pH to the alkaline side and optionally adding flocculating agents in order to flocculate the mercury sulfide. The difficulty with adding sulfide to an alkaline brine is noted in the British patent in that sulfur separates due to the reaction between hypochlorite and sulfide. Further soluble mercury polysulfides are formed in alkaline solution when an excess of sulfide is added so that the mercury is not completely recovered. The disadvantage with both of the aforesaid patented procedures is that when an excess of sulfide is added to an acid solution, hydrogen sulfide is formed and liberated into the atmosphere.

Although the methods taught by the references are useful for acidic brines, many industrial effluents from mercury cells and other mercury-containing waste streams are alkaline when discharged from the manufacturing operation. For these streams, it would not be efficacious to lower the alkaline stream to a neutral or acidic pH in order to add sulfide ions since it would then be necessary to raise the pH back to the alkaline side in order to flocculate the formed mercury sulfide.

It has now been discovered that an aqueous solution having a pH of at least 7, and preferably 9 or above, can be treated with an excess of sulfide ion over that required to react or combine with the mercury present to form insoluble mercury sulfide, and that said excess sulfide ion which is reported to result in the formation of soluble mercury polysulfide can be oxidized to decompose the mercury polysulfide to insoluble mercury sulfide, and the resultant precipitate recovered. The process is effective to such an extent that less than 1 part per million or preferably less than 50 parts per billion mercury is present in solution. Moreover, by the process of the invention there is no liberation of hydrogen sulfide into the atmosphere. In addition, it is not necessary to adjust the pH of an alkaline solution, i.e., having a pH or 7 or above to an acid pH such as about 4 or 5 in order to decompose the excess polysulfide, and then adjust the acid pH to a highly alkaline solution preferably at least 9 in order to flocculate the insoluble mercury sulfide. Moreover, it has been found that an excess of sulfide ion of up to 500 percent or more can be employed and the control required by the prior art processes obviated. Further, results equivalent or superior to prior art methods can be achieved without the employment of flocculents and settling agents.

The solution to be treated can be entirely composed of water and mercury or it can comprise only a minor amount of water. It is only necessary that the mercury and sulfide ion be soluble or sparingly soluble in the solution and that the mercury sulfide formed be insoluble, and recoverable therefrom.

The process of the invention is particularly efficacious for alkaline brines from mercury electrolytic cells which comprise an aqueous solution of sodium chloride or potassium chloride generally containing from 50 grams to 100 grams per liter of sodium chloride or potassium chloride. Effluents from said cells and cell operations (i.e., wash waters, spills, seal waters, etc.), however, can contain as little as 5 grams to as much as 300 grams per liter of salt. The brines are normally complex solutions, however, and contain in addition such elements as magnesium, mercury, silicon, calcium, barium, strontium, zinc, iron, manganese, boron, aluminum, lead, tin, chromium, copper, nickel, silver, vanadium, and germanium. In addition, dissolved chlorine or hypochlorite and chlorate ions are normally present. These brines are substantially sulfide free as any sulfide ion reacts with the dissolved chlorine, hypochlorite or chlorate ions. The term "substantially sulfide free" is intended to define any solution in which the materials which react with sulfide ion (e.g., hypochlorite ion) are present in excess, as well as solutions having no sulfide ion.

Although the invention is particularly suited for brines and industrial effluents which are initially alkaline, such as are produced in modern mercury electrolytic cells, the invention is equally applicable to any alkaline solution containing mercury or even to acid solutions which can be made alkaline by the addition of sodium hydroxide, carbonate, or other alkaline materials.

The sulfur compound employed can be any soluble or sparingly soluble sulfur compound which will provide sulfide ion in the solution. Exemplary of suitable compounds are the alkali metal sulfides such as sodium sulfide, potassium sulfide, and lithium sulfide; the alkaline earth metal sulfides such as magnesium sulfide, calcium sulfide, strontium sulfide, or beryllium sulfide; a hydrosulfied such as sodium hydrosulfide or hydrogen sulfide can be bubbled directly into the solution. Generally the sulfide is added as an aqueous solution but flake materials such as sodium sulfide or sodium hydrosulfide can be used.

The term "mercury sulfide" as used herein means mercuric sulfide, mercurous sulfide, or a mixture thereof. Normally the mercury sulfide is present as mercuric sulfide and thus one mole of sulfide ion per mole of mercury ion would provide a stoichiometric equivalent.

Inasmuch as the solution and particularly brines from a mercury electrolytic cell can contain a number of other materials which are reacted with sulfide ion such as the aforesaid metals, elemental chlorine, hypochlorite, or chlorate ion, the sulfur compound must be added in an amount sufficient to combine or react with said materials and still have an excess of sulfide ion over that required to combine with the mercury present in solution.

The sulfide ion can be present in excess over the stoichiometric equivalent of mercury by as much as 500 percent, or more. It is not necessary, however, that the excess be that high and because the excess sulfide present as mercury polysulfide must be oxidized to the insoluble mercury sulfide, it is normally preferable and quite simple to provide an excess of about 100 percent or less. An excess of at least 1 percent should be employed, however, in order to insure complete reaction. The amount of sulfur compound added will also depend upon its particular solubility in the solution. Thus, where the solution contains a large amount of organic materials and/or the sulfur compound is only sparingly soluble in the solution, a large amount of sulfur compound may be necessary to obtain the desired excess of sulfide ion. This can easily be determined, however, and is no problem in brines and substantially aqueous solutions when sodium sulfide, sodium hydrosulfide or one of the other highly water sulfides is employed.

Preferably, the soluble chlorine (to include elemental chlorine, hypochlorite, and chlorate ion) normally present in brines is removed from the solution by air oxidation prior to the addition of the sulfide compound.

Quite surprisingly the alkaline mercury-containing solution can be treated with a large excess of sulfide ion and the resultant polysulfide oxidized by the simple addition of air. For example, solutions containing minor amounts of polysulfide or sulfide ion in excess of about 20 percent or more can be oxidized by simply allowing the solution to be exposed to the atmosphere in a settling pond for a few days. Two or more times as much excess polysulfide can be oxidized by pumping the solution to a spray tower and allowing the solution to fall through the atmosphere. Still greater amounts can be oxidized by incorporating air into a settling pond or adding an oxidizing agent. For example, peroxides or hypochlorites can be added providing that the concentration of these other oxidizing agents is controlled so that precipitated mercury sulfide is not oxidized. The air oxidation, of course, is a function of both time and the amount of air introduced. The following examples will serve to illustrate the invention and its preferred embodiments.

Samples of mercury cell electrolytic sewer streams (approximately 800 milliliter of 50 grams per liter sodium chloride) were treated with varying amounts of sulfide and the pH adjusted between acid and alkaline ranges by the addition of sodium hydroxide or hydrochloric acid. The samples were put in 1 liter open beakers and allowed to set for 10 days so that any polysulfide formed could be oxidized and thus precipitate more mercury. The samples were analyzed for soluble mercury by a method which is accurate to plus or minus 5 percent and the results are shown in the following Table 1 wherein it can be seen that a solution which had a pH of 10.3 and an initial mercury concentration of about 580 p.p.b., had just 24 parts per billion mercury after 10 days settling and oxidation.

TABLE 1.—MERCURY IN SODIUM SULFIDE TREATED SEWER STREAMS

| Sulfide (p.p.m.) | | | Mercury (p.p.b.) | |
|---|---|---|---|---|
| Added | Excess | pH | 10 days | 28 days |
| (1) | (1) | 10.3 | 580 | 580 |
| 21 | 12.3 | 10.3 | 24 | 19 |
| 19 | 10.8 | 10.3 | 30 | 24 |
| 21 | | | 3.2 | 220 | 88 |
| 21 | | | 4.5 | 360 | 29 |

[1] Starting material (no Na₂S).

The following examples illustrate how excess soluble mercury polysulfide can be removed by passing air through the mercury-containing samples. Two samples of mercury-containing effluents from a mercury electrolytic cell operation (800 and 3800 milliliters, respectively) containing 4,675 and 468 parts per billion mercury, respectively, and having a pH of 12.8 and 12.9, respectively, were treated at ambient temperature with air by passing air through the solutions by means of a fritted glass tube at a rate of 5 liters per minute for a period of 24 hours. The samples were then filtered through a 0.3 micron millipore filter and the soluble mercury in the filtrate determined. The results are reported in the following Table 2 where it can be seen that in both cases the soluble mercury present in the filtrate was less than 50 parts per billion.

TABLE 2.—THE DECOMPOSITION OF MERCURY POLYSULFIDE IN AQUEOUS SOLUTIONS FROM THE SETTLING POND
[Air oxidation (24 hrs.)]

| Prior to oxidation | Soluble mercury (p.p.b.) | |
|---|---|---|
| P.p.m. sulfide ion | Before | After |
| 16 | [1] 4,675 | 35 |
| 12 | [2] 468 | 34 |

[1] pH=12.8.
[2] pH=12.9.

Although it is not required, additional flocculents or settling agents can be employed, if desired, such as, for example, soluble compounds of iron such as iron chloride, or chlorides and other soluble compounds of magnesium, cobalt, nickel, copper, zinc; sulfates such as aluminum sulfate, ferrous sulfate; acids and alkalis, glue, starches, and gums, or any compound which is insoluble in alkaline solution. In addition, filtering aids can be employed if desired.

The temperature of the solution is not critical but in brines the temperature is preferably above room temperature so that salt does not precipitate, and as a general rule more rapid flocculation and precipitation will be obtained at higher temperatures.

Although the invention is equally applicable to a mercury-containing solution of any alkaline pH (i.e., 7 or above), in order to obtain rapid agglomeration and obtain large crystals which are easy to filter and separate, the solution is preferably adjusted either initially or after the sulfide addition to a pH of above 9 and more preferably between about 10 and 13.

Although the invention has been described with reference to specific details of particular embodiments, it is not intended thereby to limit the scope of the invention except insofar as the specific details are recited in the appended claims.

We claim:

1. A process for removing soluble mercury from a brine solution while said brine is maintained at a pH of at least 7 and containing mercury ions which comprises intermixing with said solution a sulfur-containing compound capable of reacting with said mercury ions in said solution to convert said mercury ions into predominantly soluble mercury sulfides, said sulfur-containing compound being employed in an amount sufficient to react with substantially all of said mercury ions in said solution, oxidizing soluble mercury sulfides in said solution to convert said sulfides into an insoluble state, removing said insoluble mercury sulfides and recovering a solution containing less than 1 part per million of mercury in a soluble state.

2. The process of claim 1 wherein the oxidation is obtained by exposing the solution to the atmosphere.

3. The process of claim 1 wherein the oxidation is conducted by bubbling air into the solution.

4. The process of claim 1 wherein the intermixing is conducted at a solution pH of greater than 9.

5. The process of claim 1 wherein the intermixing is conducted at a solution pH of between about 10 and about 13.

6. The process of claim 1 wherein the oxidation is conducted for a time and in an amount sufficient such that less than 50 parts per billion mercury are present in the solution.

7. A process for removing soluble mercury from a brine solution while said brine is maintained at a pH of between 10 and 13 and containing mercury ions which comprises intermixing with said solution a sulfur-containing compound capable of reacting with said mercury ions in said solution to convert said mercury ions into predominantly soluble mercury sulfides, said sulfur-containing compound being employed in an amount sufficient to react with substantially all of said mercury ions in said solution, oxidizing soluble mercury sulfides in said solution to convert said sulfides into an insoluble state, removing said insoluble mercury sulfides and recovering a solution containing less than 1 part per million of mercury in a soluble state.

References Cited

UNITED STATES PATENTS 2,860,952  11/1958  Bergeron et al. _____ 23—134

FOREIGN PATENTS 916,866  1/1963  England.

OTHER REFERENCES

Kaczmarek et al.: Chem. Abs. vol. 71, paras. 66764z (1969).

Fehling et al.: Chem. Abs. vol. 68, paras. 83835d (1968).

OSCAR R. VERTIZ, Primary Examiner

C. B. RODMAN, Assistant Examiner

U.S. Cl. X.R.

210—50, 63